(12) United States Patent
Nakamura

(10) Patent No.: US 11,212,495 B2
(45) Date of Patent: Dec. 28, 2021

(54) WAVELENGTH CONVERSION ELEMENT, LIGHT SOURCE DEVICE, AND PROJECTOR

(71) Applicant: SEIKO EPSON CORPORATION, Tokyo (JP)

(72) Inventor: Norio Nakamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/025,526

(22) Filed: Sep. 18, 2020

(65) Prior Publication Data

US 2021/0092336 A1     Mar. 25, 2021

(30) Foreign Application Priority Data

Sep. 20, 2019   (JP) .............................. JP2019-171523

(51) Int. Cl.
*G03B 21/20* (2006.01)
*H04N 9/31* (2006.01)
*G02B 27/09* (2006.01)

(52) U.S. Cl.
CPC ....... *H04N 9/3152* (2013.01); *G02B 27/0955* (2013.01); *G02B 27/0977* (2013.01); *G03B 21/204* (2013.01); *G03B 21/2066* (2013.01)

(58) Field of Classification Search
CPC .... G03B 21/006; G03B 21/008; G03B 21/28; G03B 21/145; G03B 21/204; G03B 21/208; G03B 21/2013; G03B 21/2033; G03B 21/2066; G02B 27/09; G02B 27/095; G02B 27/0922; G02B 27/0944; G02B 27/0955; G02B 27/0977; F21V 13/04; F21V 13/08; F21V 13/14; H04N 9/3105; H04N 9/3114; H04N 9/3141; H04N 9/3152; H04N 9/3158; H04N 9/3161; H04N 9/3164; H04N 9/3173; H04N 9/3197

See application file for complete search history.

(56) References Cited

U.S. PATENT DOCUMENTS

| | | | |
|---|---|---|---|
| 9,921,353 B2 | 3/2018 | Hikmet et al. | |
| 2011/0310362 A1* | 12/2011 | Komatsu | F21V 7/00 353/85 |
| 2013/0335709 A1* | 12/2013 | Akiyama | G02B 27/0927 353/20 |
| 2015/0060917 A1 | 3/2015 | Vampola et al. | |
| 2019/0097095 A1* | 3/2019 | Yamanaka | F21S 41/16 |

FOREIGN PATENT DOCUMENTS

| | | |
|---|---|---|
| JP | 2013-545233 A | 12/2013 |
| JP | 2015-511773 A | 4/2015 |
| JP | 2016-531381 A | 10/2016 |
| WO | 2012/56382 A1 | 5/2012 |

* cited by examiner

*Primary Examiner* — Sultan Chowdhury
(74) *Attorney, Agent, or Firm* — Dority & Manning, P.A.

(57) ABSTRACT

A wavelength conversion element according to the present disclosure includes a cemented body obtained by bonding a first wavelength conversion member which is excited by first light to emit second light having a wavelength band different from a wavelength band of the first light, and a first light guide member configured to transmit the first light and the second light, and a reflecting member which is disposed so as to be opposed to at least one surface parallel to a first direction out of a plurality of outer circumferential surfaces of the cemented body, and reflects at least one of the first light and the second light.

9 Claims, 5 Drawing Sheets

WAVELENGTH CONVERSION ELEMENT, LIGHT SOURCE DEVICE, AND PROJECTOR

The present application is based on, and claims priority from JP Application Serial Number 2019-171523, filed Sep. 20, 2019, the disclosure of which is hereby incorporated by reference herein in its entirety.

BACKGROUND

1. Technical Field

The present disclosure relates to a wavelength conversion element, a light source device, and a projector.

2. Related Art

There has been proposed a light source device which irradiates a phosphor with excitation light emitted from a light source, and uses the fluorescence emitted from the phosphor as illumination light. In the specification of U.S. Pat. No. 9,921,353, there is disclosed a light source device which makes the excitation light having entered a light guide from a first surface thereof enter the phosphor disposed on a second surface side opposite to the first surface of the light guide to thereby generate the fluorescence, and takes out the illumination light including the excitation light and the fluorescence from an end surface of the phosphor.

However, in the light source device described above, the illuminance distribution of the excitation light with which the phosphor is irradiated becomes inhomogeneous. Further, since a specific area of the phosphor is locally irradiated with the excitation light to cause the phosphor to generate heat, deterioration in fluorescence emission efficiency is incurred.

SUMMARY

A wavelength conversion element according to an aspect of the present disclosure includes a cemented body obtained by bonding a first wavelength conversion member which is excited by first light to emit second light having a wavelength band different from a wavelength band of the first light, and a first light guide member configured to transmit the first light and the second light, and a reflecting member which is disposed so as to be opposed to at least one surface parallel to a first direction out of a plurality of outer circumferential surfaces of the cemented body, and reflects at least one of the first light and the second light, wherein the cemented body is formed by bonding a first surface parallel to the first direction in the first wavelength conversion member, and a second surface parallel to the first direction in the first light guide member to each other, and the first light enters the cemented body from a first outer circumferential surface crossing the first direction out of the plurality of outer circumferential surfaces.

The wavelength conversion element may be configured such that the cemented body has a second wavelength conversion member bonded to a third surface opposite to the second surface of the first light guide member, and the first light guide member is sandwiched by the first wavelength conversion member and the second wavelength conversion member.

The wavelength conversion element may be configured such that the second wavelength conversion member is excited by the first light to emit third light having a wavelength band different from the wavelength band of the first light and the wavelength band of the second light.

The wavelength conversion element may be configured such that the cemented body has a second light guide member bonded to a fourth surface opposite to the first surface of the first wavelength conversion member, and is configured to transmit the first light and the second light, and the first wavelength conversion member is sandwiched by the first light guide member and the second light guide member.

The wavelength conversion element may be configured such that the first wavelength conversion member includes a first member which is excited by the first light to emit the second light, and a second member which is excited by the first light to emit third light having a wavelength band different from the wavelength band of the first light and the wavelength band of the second light.

The wavelength conversion element may be configured such that the wavelength conversion element further includes a diffusion element which is disposed so as to be opposed to a second outer circumferential surface opposite to the first outer circumferential surface out of the outer circumferential surfaces of the cemented body, and diffuses at least one of the first light and the second light.

The wavelength conversion element may be configured such that the first light guide member is made of sapphire.

A light source device according to an aspect of the present disclosure includes a light source configured to emit the first light, and the wavelength conversion element according to the aspect described above.

A projector according to an aspect of the present disclosure includes the light source device according to the aspect described above, a light modulation device configured to modulate light from the light source device in accordance with image information, and a projection optical device configured to project the light modulated by the light modulation device.

DESCRIPTION OF EXEMPLARY EMBODIMENTS

First Embodiment

Figure 1:
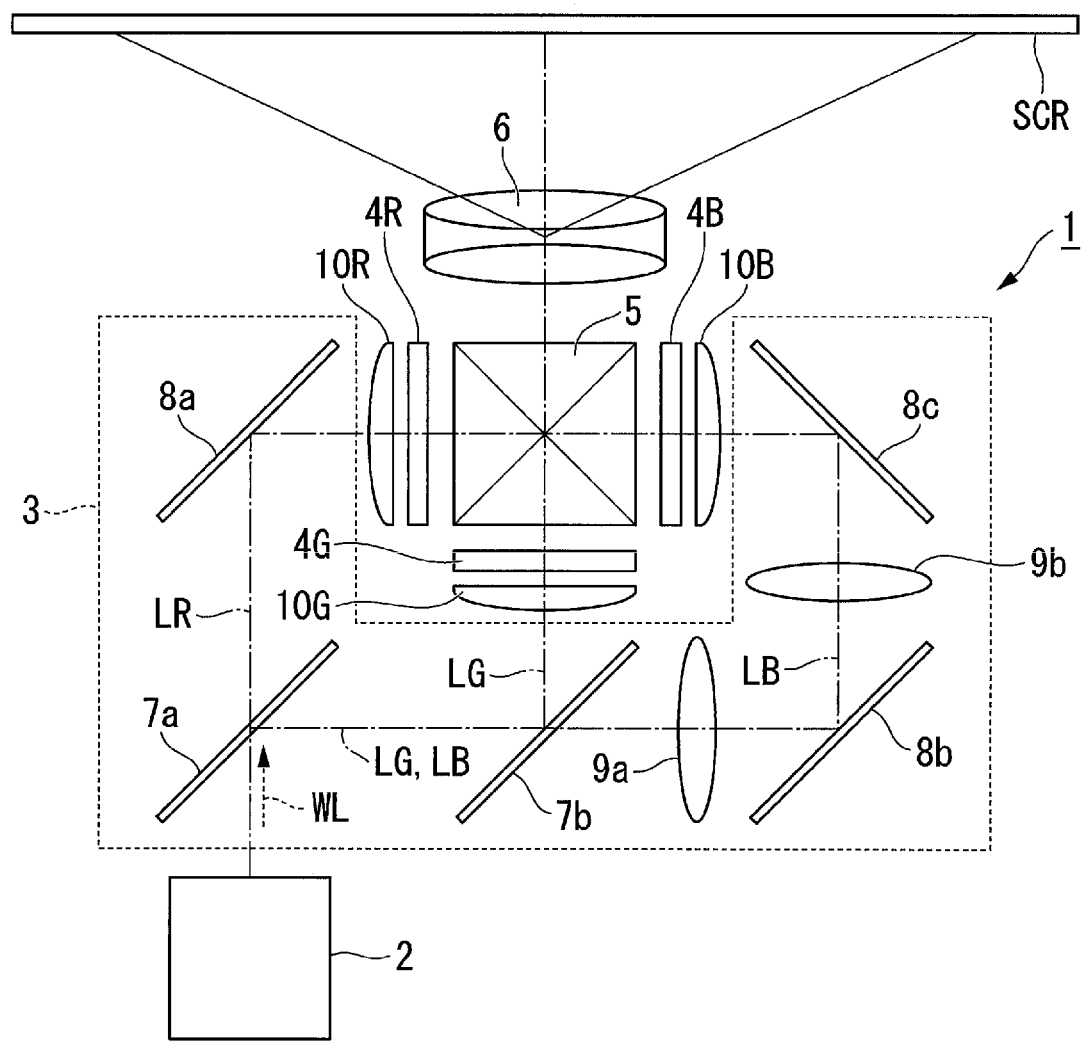
FIG. 1 is a diagram showing a schematic configuration of a projector according to a first embodiment.

A first embodiment of the present disclosure will hereinafter be described using FIG. 1 through FIG. 3.

In the drawings described below, the constituents are shown with the respective scale ratios of the sizes different from each other in some cases in order to make the constituents eye-friendly.

An example of a projector according to the present embodiment will be described.

FIG. 1 is a diagram showing a schematic configuration of the projector according to the present embodiment.

As shown in FIG. 1, a projector 1 according to the present embodiment is a projection-type image display device for displaying a color image on a screen SCR. The projector 1 is provided with an illumination device 2, a color separation optical system 3, a light modulation device 4R, a light modulation device 4G, a light modulation device 4B, a combining optical system 5, and a projection optical device 6. The configuration of the illumination device 2 will be described later.

The color separation optical system 3 is provided with a first dichroic mirror 7a, a second dichroic mirror 7b, a reflecting mirror 8a, a reflecting mirror 8b, a reflecting mirror 8c, a relay lens 9a, and a relay lens 9b. The color separation optical system 3 separates illumination light WL emitted from the illumination device 2 into red light LR, green light LG, and blue light LB, and then guides the red light LR to the light modulation device 4R, guides the green light LG to the light modulation device 4G, and guides the blue light LB to the light modulation device 4B.

A field lens 10R is disposed between the color separation optical system 3 and the light modulation device 4R, and substantially collimates the incident light and then emits the result toward the light modulation device 4R. A field lens 10G is disposed between the color separation optical system 3 and the light modulation device 4G, and substantially collimates the incident light and then emits the result toward the light modulation device 4G. A field lens 10B is disposed between the color separation optical system 3 and the light modulation device 4B, and substantially collimates the incident light and then emits the result toward the light modulation device 4B.

The first dichroic mirror 7a transmits a red light component and reflects a green light component and a blue light component. The second dichroic mirror 7b reflects the green light component, and transmits the blue light component. The reflecting mirror 8a reflects the red light component. The reflecting mirror 8b and the reflecting mirror 8c reflect the blue light component.

The red light LR having been transmitted through the first dichroic mirror 7a is reflected by the reflecting mirror 8a, and is then transmitted through the field lens 10R to enter an image forming area of the light modulation device 4R for the red light. The green light LG having been reflected by the first dichroic mirror 7a is further reflected by the second dichroic mirror 7b, and then transmitted through the field lens 10G to enter an image forming area of the light modulation device 4G for the green light. The blue light LB having been transmitted through the second dichroic mirror 7b enters an image forming area of the light modulation device 4B for the blue light via the relay lens 9a, the reflecting mirror 8b on the incident side, the relay lens 9b, the reflecting mirror 8c on the exit side, and the field lens 10B.

The light modulation device 4R, the light modulation device 4G, and the light modulation device 4B each modulate the colored light as the incident light in accordance with image information to thereby form image light. The light modulation device 4R, the light modulation device 4G, and the light modulation device 4B are each formed of a liquid crystal light valve. Although not shown in the drawings, on the light incident side of each of the light modulation device 4R, the light modulation device 4G, and the light modulation device 4B, there is disposed an incident side polarization plate. On the light exit side of each of the light modulation device 4R, the light modulation device 4G, and the light modulation device 4B, there is disposed an exit side polarization plate.

The combining optical system 5 combines the image light emitted from the light modulation device 4R, the image light emitted from the light modulation device 4G, and the image light emitted from the light modulation device 4B with each other to form full-color image light. The combining optical system 5 is formed of a cross dichroic prism having four rectangular prisms bonded to each other to have a substantially square shape in the plan view. On the boundary surfaces having a substantially X shape on which the rectangular prisms are bonded to each other, there are formed dielectric multilayer films.

The image light having been emitted from the combining optical system 5 is projected by the projection optical device 6 in an enlarged manner to form an image on the screen SCR. In other words, the projection optical device 6 projects the light modulated by the light modulation device 4R, the light modulated by the light modulation device 4G, and the light modulated by the light modulation device 4B. The projection optical device 6 is constituted by a plurality of projection lenses.

An example of the illumination device 2 in the present embodiment will be described.

Figure 2:
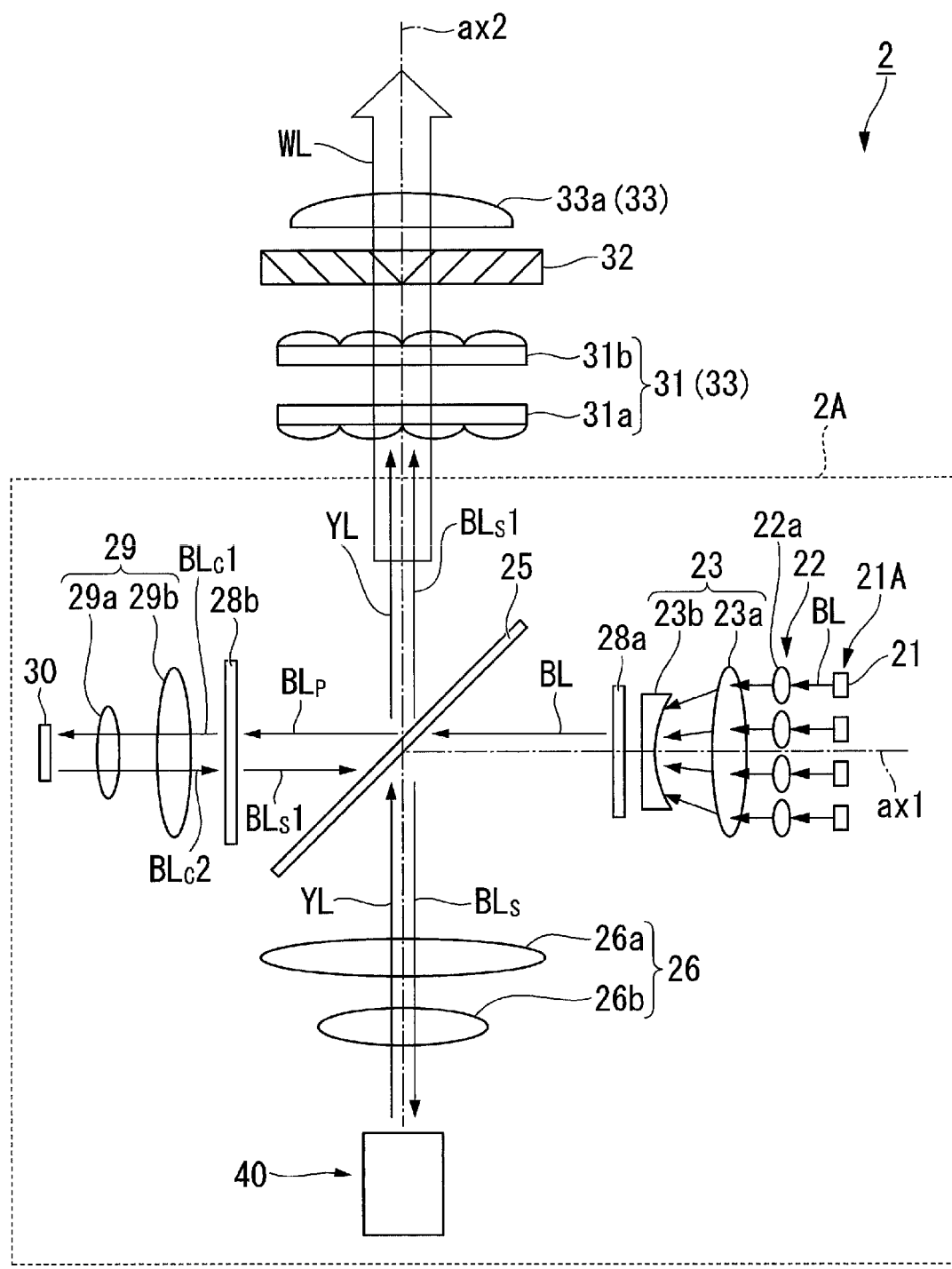
FIG. 2 is a diagram showing a schematic configuration of an illumination device.

FIG. 2 is a diagram showing a schematic configuration of the illumination device 2.

As shown in FIG. 2, the illumination device 2 is provided with a light source device 2A, an integrator optical system 31, a polarization conversion element 32, and a superimposing lens 33a. The integrator optical system 31 and the superimposing lens 33a constitute a superimposing optical system 33.

The light source device 2A is provided with an array light source (a light source) 21A, a collimator optical system 22, an afocal optical system 23, a first wave plate 28a, a polarization split element 25, a first light collection optical system 26, a wavelength conversion element 40, a second wave plate 28b, a second light collection optical system 29, and a diffusely reflecting element 30.

The array light source 21A, the collimator optical system 22, the afocal optical system 23, the first wave plate 28a, the polarization split element 25, the second wave plate 28b, the second light collection optical system 29, and the diffusely reflecting element 30 are arranged in series on a light axis ax1. The wavelength conversion element 40, the first light collection optical system 26, the polarization split element 25, the integrator optical system 31, the polarization conversion element 32, and the superimposing lens 33a are arranged in series on an illumination light axis ax2. The light axis ax1 and the illumination light axis ax2 are located in the same plane, and are perpendicular to each other.

The array light source 21A is provided with a plurality of semiconductor lasers 21 as solid-state light sources. The plurality of semiconductor lasers 21 is arranged in an array in a plane perpendicular to the light axis ax1. The semiconductor lasers 21 each emit a blue light beam BL in a first wavelength band, specifically, a laser beam in the first wavelength band with a peak wavelength of, for example, 460 nm. The array light source 21A emits the pencil consisting of the plurality of light beams BL. The array light source 21A in the present embodiment corresponds to a "light source" in the appended claims.

The light beams BL emitted from the array light source 21A enter the collimator optical system 22. The collimator optical system 22 converts the light beams BL emitted from the array light source 21A into parallel light. The collimator optical system 22 is constituted by a plurality of collimator lenses 22a arranged side by side in an array. The collimator lenses 22a are disposed so as to correspond respectively to the semiconductor lasers 21.

The light beams BL having passed through the collimator optical system 22 enter the afocal optical system 23. The afocal optical system 23 adjusts the thickness (the diameter) of a flux consisting of the light beams BL. The afocal optical system 23 is constituted by, for example, a convex lens 23a and a concave lens 23b.

The light beams BL having passed through the afocal optical system 23 enter the first wave plate 28a. The first wave plate 28a is, for example, a ½ wave plate which is made rotatable. The light beams BL emitted from the semiconductor lasers 21 are each linearly polarized light. By appropriately setting the rotational angle of the first wave plate 28a, light beams including an S-polarization component and a P-polarization component with respect to the polarization split element 25 at a predetermined rate can be obtained as the light beams BL transmitted through the first wave plate 28a. By rotating the first wave plate 28a, it is possible to change the ratio between the S-polarization component and the P-polarization component.

The light beams BL, which are generated by passing through the first wave plate 28a, and include the S-polarization component and the P-polarization component, enter the polarization split element 25. The polarization split element 25 is formed of, for example, a polarization beam splitter having wavelength selectivity. The polarization split element 25 forms an angle of 45° with the light axis ax1 and the illumination light axis ax2.

The polarization split element 25 has a polarization split function of splitting each of the light beams BL into a light beam BLs as the S-polarization component with respect to the polarization split element 25 and a light beam BLp as the P-polarization component. Specifically, the polarization split element 25 reflects the light beam BLs as the S-polarization component, and transmits the light beam BLp as the P-polarization component. Further, the polarization split element 25 has a color separation function of transmitting a yellow light component different in wavelength band from the light beams BL as blue light beams irrespective of the polarization state of the yellow light component in addition to the polarization split function.

The light beam BLs as the S-polarized light having been emitted from the polarization split element 25 enters the first light collection optical system 26. The first light collection optical system 26 converges the light beam BLs toward the wavelength conversion element 40 as the excitation light. The first light collection optical system 26 is constituted by a first lens 26a and a second lens 26b. The first lens 26a and the second lens 26b are each formed of a convex lens. The light beam BLs having been emitted from the first light collection optical system 26 enters the wavelength conversion element 40 in a converged state.

In the present embodiment, the wavelength conversion element 40 converts the excitation light (the light beam BLs) having entered the wavelength conversion element 40 into fluorescence YL in a second wavelength band different from the first wavelength band of the excitation light. The wavelength conversion element 40 in the present embodiment is formed of a stationary type wavelength conversion element which is not made rotatable due to a motor or the like.

It should be noted that the configuration of the wavelength conversion element 40 will be described later.

The fluorescence YL as yellow light having been generated in the wavelength conversion element 40 is collimated by the first light collection optical system 26, and then enters the polarization split element 25. As described above, since the polarization split element 25 has a property of transmitting the yellow light component irrespective of the polarization state, the fluorescence YL is transmitted through the polarization split element 25.

Meanwhile, the light beam BLp as the P-polarized light having been emitted from the polarization split element 25 enters the second wave plate 28b. The second wave plate 28b is formed of a ¼ wave plate disposed in the light path between the polarization split element 25 and the diffusely reflecting element 30. Therefore, the light beam BLp as the P-polarized light having been emitted from the polarization split element 25 is converted by the second wave plate 28b into, for example, blue light BLc1 as clockwise circularly polarized light, and then enters the second light collection optical system 29.

The second light collection optical system 29 is constituted by a first lens 29a and a second lens 29b. The first lens 29a and the second lens 29b are each formed of a convex lens. The second light collection optical system 29 makes the blue light BLc1 enter the diffusely reflecting element 30 in a converged state.

The diffusely reflecting element 30 is disposed on the light path of the light beam BLp emitted from the polarization split element 25, and diffusely reflects the blue light BLc1, which has been emitted from the second light collection optical system 29, toward the polarization split element 25. It is desirable for the diffusely reflecting element 30 to perform the Lambertian reflection on the blue light BLc1, and at the same time, not to disturb the polarization state of the blue light BLc1.

The light diffusely reflected by the diffusely reflecting element 30 is hereinafter referred to as blue light BLc2. In the present embodiment, by diffusely reflecting the blue light BLc1, there can be obtained the blue light BLc2 having a substantially homogenous illuminance distribution. For example, the blue light BLc1 as the clockwise circularly polarized light is diffusely reflected by the diffusely reflecting element 30 to thereby turn to the blue light BLc2 as the counterclockwise circularly polarized light.

The blue light BLc2 is converted by the second light collection optical system 29 into parallel light, and then enters the second wave plate 28b once again. The blue light BLc2 as the counterclockwise circularly polarized light is converted by the second wave plate 28b into blue light BLs1 as S-polarized light. The blue light BLs1 as the S-polarized light is reflected by the polarization split element 25 toward the integrator optical system 31.

Thus, the blue light BLs1 is combined with the fluorescence YL having been transmitted through the polarization split element 25, and is used as the illumination light WL. Specifically, the blue light BLs1 and the fluorescence YL are emitted from the polarization split element 25 toward the respective directions the same as each other, and thus, there is formed the illumination light WL as the white light obtained by combining the blue light BLs1 and the fluorescence (the yellow light) YL with each other.

The illumination light WL is emitted toward the integrator optical system 31. The integrator optical system 31 is constituted by a first lens array 31a and a second lens array 31b. The first lens array 31a and the second lens array 31b each have a configuration having a plurality of lenses arranged in an array.

The illumination light WL having been transmitted through the integrator optical system 31 enters the polarization conversion element 32. The polarization conversion element 32 has a polarization split film and a wave plate. The polarization conversion element 3 converts the illumination light WL including the fluorescence YL as unpolarized light into linearly polarized light made to enter the light modulation device 4R, the light modulation device 4G, and the light modulation device 4B.

The illumination light WL having been transmitted through the polarization conversion element 32 enters the superimposing lens 33a. The superimposing lens 33a homogenizes the illuminance distribution of the illumination light WL in the illumination target area in cooperation with the integrator optical system 31. The illumination device 2 generates the illumination light WL in such a manner as described above.

The configuration of the wavelength conversion element 40 will hereinafter be described.

Figure 3:
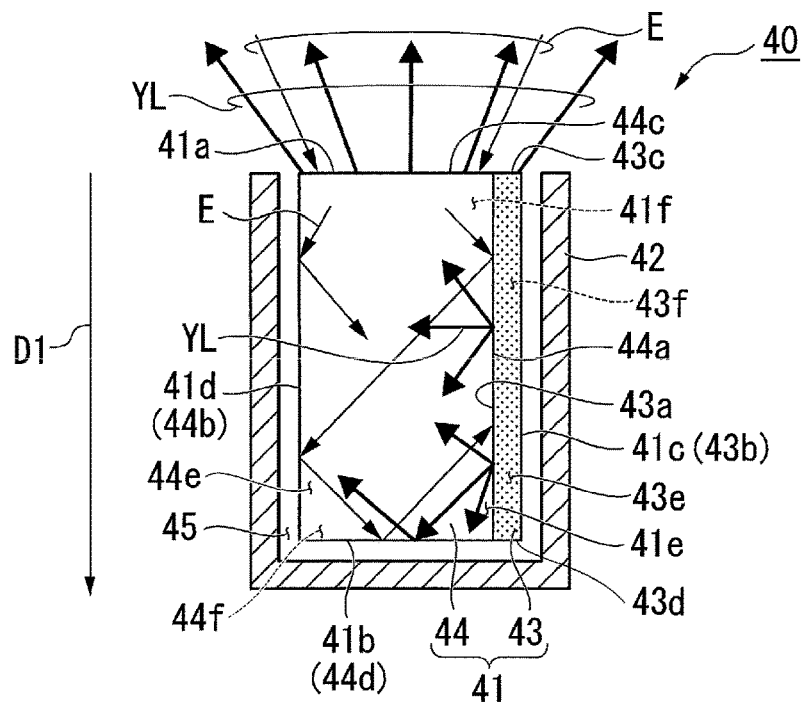
FIG. 3 is a cross-sectional view of a wavelength conversion element.

FIG. 3 is a cross-sectional view of the wavelength conversion element 40. In FIG. 3 and the following drawings, the light beam BLs which enters a phosphor layer 43 to thereby generate the fluorescence YL is referred to as excitation light E in some cases.

As shown in FIG. 3, the wavelength conversion element 40 is provided with a cemented body 41 and a reflecting member 42. The cemented body 41 is formed by bonding the phosphor layer (a first wavelength conversion member) 43 and a light guide member (a first light guide member) 44 to each other. The wavelength conversion element in the present embodiment is a reflective wavelength conversion element for emitting the fluorescence YL from a surface which the excitation light E enters.

The cemented body 41 is formed of a hexahedron. The cemented body 41 has six outer circumferential surfaces. Specifically, the cemented body 41 has a first outer circumferential surface 41a, a second outer circumferential surface 41b, a third outer circumferential surface 41c, a fourth outer circumferential surface 41d, a fifth outer circumferential surface 41e, and a sixth outer circumferential surface 41f.

In the present embodiment, the shape of the cemented body 41 viewed from the normal direction of the first outer circumferential surface 41a is a rectangular shape. The first outer circumferential surface 41a is a plane of incidence of the excitation light E and an exit surface of the fluorescence YL in the wavelength conversion element 40. The second outer circumferential surface 41b is a surface opposed to the first outer circumferential surface 41a. In other words, the first outer circumferential surface 41a and the second outer circumferential surface 41b face to the respective sides opposed to each other. In the present embodiment, the second outer circumferential surface 41b is a surface forming a bottom section in the cemented body 41. The third outer circumferential surface 41c is a surface which crosses the first outer circumferential surface 41a, and is parallel to a first direction D1 in which the excitation light E enters the wavelength conversion element 40. Here, the first direction D1 is a direction along the vertical direction in FIG. 3. The fourth outer circumferential surface 41d is a surface opposed to the third outer circumferential surface 41c. In other words, the fourth outer circumferential surface 41d and the third outer circumferential surface 41c face to the respective sides opposed to each other. The fifth outer circumferential surface 41e and the sixth outer circumferential surface 41f face to the respective side opposed to each other. In the present embodiment, the fifth outer circumferential surface 41e is an outer surface on the front side in the penetration direction of the sheet of FIG. 3 in the cemented body 41, and the sixth outer circumferential surface 41f is an outer surface on the back side in the penetration direction of the sheet of FIG. 3 in the cemented body 41.

The phosphor layer 43 includes a first joint surface (a first surface) 43a parallel to the first direction D1, a surface 43b facing to an opposite side to the first joint surface 43a, an upper surface 43c, a lower surface 43d, a front surface 43e, and a rear surface 43f.

The upper surface 43c of the phosphor layer 43 is a surface crossing the first direction D1, and constitutes a part of the first outer circumferential surface 41a of the cemented body 41. The lower surface 43d of the phosphor layer 43 is a surface crossing the first direction D1, and constitutes a part of the second outer circumferential surface 41b of the cemented body 41. The surface 43b of the phosphor layer 43 constitutes the third outer circumferential surface 41c of the cemented body 41. The front surface 43e of the phosphor layer 43 constitutes a part of the outer surface on the front side in the penetration direction of the sheet of FIG. 3 in the cemented body 41, and the rear surface 43f of the phosphor layer 43 constitutes a part of the outer surface on the back side in the penetration direction of the sheet of FIG. 3 in the cemented body 41.

The phosphor layer 43 includes a phosphor material for converting the excitation light (first light) E emitted from the array light source 21A into the fluorescence (second light) YL having a different wavelength band from that of the excitation light E. The second wavelength band is in a range of, for example, 490 through 750 nm, and the fluorescence YL is the yellow light including the green light component and the red light component. It should be noted that it is also possible for the phosphor layer 43 to include a single-crystal phosphor.

The phosphor layer 43 includes, for example, an yttrium aluminum garnet (YAG) phosphor. Taking YAG:Ce including cerium (Ce) as an activator agent for example, as the phosphor layer 43, there can be used a material obtained by mixing raw powder including constituent elements such as $Y_2O_3$, $Al_2O_3$, and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process, or a thermal plasma process.

The light guide member 44 is a member for transmitting the excitation light E and the fluorescence YL.

The light guide member 44 includes a second joint surface (a second surface) 44a parallel to the first direction D1, a surface 44b facing to an opposite side to the second joint surface 44a, an upper surface 44c, a lower surface 44d, a front surface 44e, and a rear surface 44f.

The upper surface 44c of the light guide member 44 is a surface crossing the first direction D1, and constitutes a part of the first outer circumferential surface 41a of the cemented body 41. The lower surface 44d of the light guide member 44 is a surface crossing the first direction D1, and constitutes a part of the second outer circumferential surface 41b of the cemented body 41. The surface 44b of the light guide member 44 constitutes the fourth outer circumferential surface 41d of the cemented body 41.

The front surface 44e constitutes a part of the outer surface on the front side in the penetration direction of the sheet of FIG. 3 in the cemented body 41, and the rear surface 44f constitutes a part of the outer surface on the back side in the penetration direction of the sheet of FIG. 3 in the cemented body 41.

It should be noted that the constituent material of the light guide member 44 is not particularly limited, but it is desirable to use a material which is close in refractive index to the phosphor layer 43, and is high in thermal conductivity. As the constituent material of the light guide member 44, there can be used, for example, sapphire.

The cemented body 41 in the present embodiment is formed by bonding the first joint surface 43a in the phosphor layer 43 and the second joint surface 44a in the light guide member 44 to each other. An adhesive not shown is disposed between the first joint surface 43a of the phosphor layer 43 and the second joint surface 44a of the light guide member 44. As the adhesive, it is preferable to use a material small in refractive index difference from the phosphor layer 43 and the light guide member 44.

In the present embodiment, the reflecting member 42 is disposed so as to be opposed to at least one surface parallel to the first direction D1 out of the plurality of outer circumferential surfaces 41a through 41f of the cemented body 41, specifically, at least one surface out of the third outer circumferential surface 41c, and the fourth outer circumferential surface 41d.

The reflecting member 42 reflects the excitation light E and the fluorescence YL. As the constituent material of the reflecting member 42, there can be used a metal material high in optical reflectance such as aluminum or silver, or can also be used a dielectric multilayer film.

It is desirable for the reflecting member 42 to be disposed so as to be separated from the outer circumferential surface of the cemented body 41. In other words, it is desirable for air layers 45 to respectively intervene between the second outer circumferential surface 41b of the cemented body 41 and the reflecting member 42, between the third outer circumferential surface 41c of the cemented body 41 and the reflecting member 42, and between the fourth outer circumferential surface 41d of the cemented body 41 and the reflecting member 42.

The wavelength conversion element 40 is disposed so that the first outer circumferential surface 41a of the cemented body 41 is opposed to the second lens 26b of the first light collection optical system 26. Thus, the excitation light E emitted from the first light collection optical system 26 enters the cemented body 41 via the first outer circumferential surface 41a.

Then, functions and advantages of the wavelength conversion element 40 according to the present embodiment will be described.

In the wavelength conversion element 40, the excitation light E collected by the first light collection optical system 26 enters the cemented body 41 from the first outer circumferential surface 41a. Specifically, the excitation light E is made to enter the light guide member 44 from the upper surface 44c along the first direction D1.

In the wavelength conversion element 40 according to the present embodiment, a propagation direction (the first direction D1) in which the excitation light E propagates in the light guide member 44 and the joint interface between the light guide member 44 and the phosphor layer 43 are parallel to each other. Therefore, the excitation light E having entered the light guide member 44 proceeds through the light guide member 44 in the first direction D1 to thereby achieve the waveguide toward the lower surface 44d, and at the same time, enters the phosphor layer 43 via the first joint surface 43a to generate the fluorescence YL. On this occasion, since the excitation light E propagates through the light guide member 44 along the joint interface between the light guide member 44 and the phosphor layer 43, the phosphor layer 43 (the first joint surface 43a) is homogenously irradiated with the excitation light E. Therefore, the irradiation density in the phosphor layer 43 with the excitation light E is suppressed to a low level.

Therefore, according to the wavelength conversion element 40 related to the present embodiment, the local heat generation in the phosphor layer 43 is suppressed by suppressing the irradiation density in the phosphor layer 43 with the excitation light E, and thus, it is possible to prevent the deterioration of the fluorescence emission efficiency due to a rise in temperature of the phosphor layer 43.

Further, since the phosphor layer 43 is bonded to the light guide member 44 on the plane of incidence of the excitation light E, the heat of the phosphor layer 43 generated by the incidence of the excitation light E is efficiently released via the light guide member 44. Further, in the present embodiment, since sapphire high in thermal conductivity is used as the light guide member 44, it is possible to realize the high fluorescence conversion efficiency by efficiently releasing the heat of the phosphor layer 43 to thereby suppress the rise in temperature of the phosphor layer 43.

In the wavelength conversion element 40 according to the present embodiment, the fluorescence YL generated in the phosphor layer 43 is emitted inside the light guide member 44, propagates through the light guide member 44, and is then emitted from the upper surface 44c of the light guide member 44. It should be noted that a part of the fluorescence YL is also emitted from the upper surface 43c of the phosphor layer 43. In other words, the fluorescence YL emitted from the first outer circumferential surface 41a of the cemented body 41 consists of a fluorescence component emitted from the upper surface 44c of the light guide member 44 and a fluorescence component emitted from the upper surface 43c of the phosphor layer 43.

Further, a part of the light (the excitation light E and the fluorescence YL) propagating through the light guide member 44 reaches the surface 44b of the light guide member 44. Out of the light having reached the surface 44b of the light guide member 44, the light entering the surface 44b at an incident angle equal to or larger than the critical angle is totally reflected by the surface 44b to thereby be sent back into the light guide member 44, and then propagates through the light guide member 44 once again.

In contrast, the light entering the surface 44b at an incident angle smaller than the critical angle passes through the surface 44b to be emitted outside the light guide member 44. In the wavelength conversion element 40 according to the present embodiment, since the reflecting member 42 is disposed so as to be opposed to the surface 44b of the light guide member 44, the light having passed through the surface 44b is reflected by the reflecting member 42 and then propagates through the light guide member 44 once again.

Further, a part of the light (the excitation light E and the fluorescence YL) propagating through the light guide member 44 reaches the lower surface 44d of the light guide member 44. The light having reached the lower surface 44d of the light guide member 44 is sent back into the light guide member 44 by being totally reflected by the lower surface 44d, or by being reflected by the reflecting member 42 disposed so as to be opposed to the lower surface 44d even when being transmitted through the lower surface 44d, and then propagates through the light guide member 44 once again.

Further, a part of the fluorescence YL generated in the phosphor layer 43 or a part of the excitation light E having failed to be converted into the fluorescence YL by the phosphor layer 43 reaches the surface 43b of the phosphor layer 43. Out of the fluorescence YL or the excitation light E having reached the surface 43b, the light having entered the surface 43b at an incident angle equal to or larger than the critical angle is totally reflected by the surface 43b to be sent back into the phosphor layer 43, and then, the excitation light E is used for generating the fluorescence YL, and the fluorescence YL is transmitted through the phosphor layer 43 and then taken in the light guide member 44.

Further, the fluorescence YL or the excitation light E having entered the surface 43b at an incident angle smaller than the critical angle passes through the surface 43b and is then emitted outside the cemented body 41, but is reflected by the reflecting member 42 disposed so as to be opposed to the surface 43b of the phosphor layer 43 to be sent back into the phosphor layer 43, and then, the excitation light E is used for generating the fluorescence YL, and the fluorescence YL is transmitted through the phosphor layer 43 and then taken in the light guide member 44. Alternatively, the fluorescence YL reflected by the reflecting member 42 is radiated from a gap between the reflecting member 42 and the surface 43b of the phosphor layer 43.

As described hereinabove, in the wavelength conversion element 40 according to the present embodiment, since the excitation light E propagates through the light guide member 44 along the joint interface in the cemented body 41 having the light guide member 44 and the phosphor layer 43 bonded to each other, it is possible to increase the homogeneity of the illuminance distribution of the excitation light E by suppressing the light density of the excitation light E in the phosphor layer 43 (the first joint surface 43a) to a low level. Thus, the local heat generation in the phosphor layer 43 is prevented, and it is possible to prevent the deterioration of the fluorescence emission efficiency due to the rise in temperature of the phosphor layer 43. Therefore, since the fluorescence YL is efficiently generated in the phosphor layer 43, it is possible to generate the illumination light WL high in luminance.

As described above, according to the wavelength conversion element 40 related to the present embodiment, the illuminance distribution of the excitation light E in the phosphor layer 43 is homogenized, and at the same time, the rise in temperature of the phosphor layer 43 is suppressed. Thus, the wavelength conversion element 40 high in light emission efficiency can be realized. In other words, according to the wavelength conversion element 40 related to the present embodiment, it is possible to realize the wavelength conversion element 40 which can obtain a high heat radiation property, and is high in wavelength conversion efficiency.

Further, the light source device 2A according to the present embodiment is provided with the wavelength conversion element 40 described above, and can therefore increase the light emission efficiency. Further, the projector 1 according to the present embodiment is provided with the light source device 2A described above, and is therefore capable of projecting an image high in brightness.

Second Embodiment

A second embodiment of the present disclosure will hereinafter be described using FIG. 4.

The configurations of a projector and an illumination device according to the second embodiment are substantially the same as those in the first embodiment, and the configuration of the wavelength conversion element is different from that of the first embodiment. Therefore, the description of the whole of the projector and the illumination device will be omitted.

Figure 4:
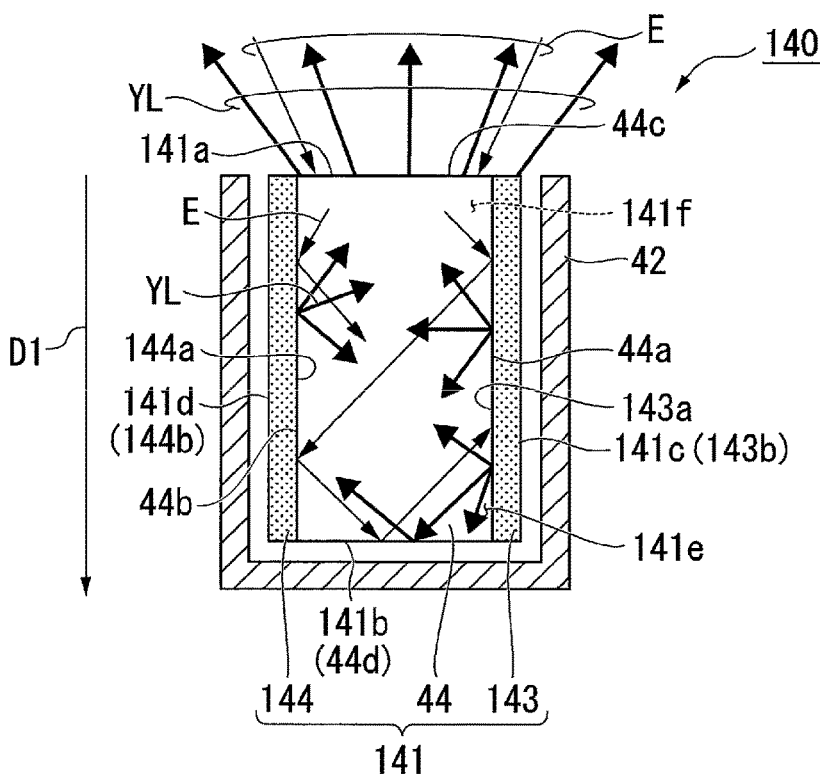
FIG. 4 is a cross-sectional view of a wavelength conversion element in a projector according to a second embodiment.

FIG. 4 is a cross-sectional view of a wavelength conversion element 140 according to the present embodiment.

As shown in FIG. 4, the wavelength conversion element 140 is provided with a cemented body 141 and the reflecting member 42. The cemented body 141 in the present embodiment is formed by bonding a first phosphor layer (a first wavelength conversion member) 143, a second phosphor layer (a second wavelength conversion member) 144, and the light guide member 44 to each other.

The first phosphor layer 143 and the second phosphor layer 144 each have substantially the same configuration as that of the phosphor layer 43 in the first embodiment. The first phosphor layer 143 includes a first joint surface (the first surface) 143a parallel to the first direction D1, and a surface 143b facing to an opposite side to the first joint surface 143a. The second phosphor layer 144 includes a first joint surface 144a parallel to the first direction D1, and a surface 144b facing to an opposite side to the first joint surface 144a.

In the present embodiment, the reflecting member 42 is disposed so as to be opposed to a third outer circumferential surface 141c, and a fourth outer circumferential surface 141d parallel to the first direction D1 out of a plurality of outer circumferential surfaces 141a through 141f in the cemented body 141.

The cemented body 141 in the present embodiment is formed by bonding the first joint surface 143a in the first phosphor layer 143 and the second joint surface 44a in the light guide member 44 to each other, and bonding the first joint surface 144a in the second phosphor layer 144 and a reverse surface (a third surface) 44b opposite to the second joint surface 44a in the light guide member 44 to each other.

In other words, the light guide member 44 in the present embodiment is sandwiched between the first phosphor layer 143 and the second phosphor layer 144. In the present embodiment, the surface 143b of the first phosphor layer 143 forms the third outer circumferential surface 141c of the cemented body 141, and the surface 144b of the second phosphor layer 144 forms the fourth outer circumferential surface 141d of the cemented body 141.

In the wavelength conversion element 140 according to the present embodiment, since there is provided the cemented body 141 having the light guide member 44 sandwiched between the first phosphor layer 143 and the second phosphor layer 144, it is possible to obtain the fluorescence YL high in luminance by the excitation light E propagating through the light guide member 44 entering the first phosphor layer 143 and the second phosphor layer 144 to generate the fluorescence YL.

Third Embodiment

A third embodiment of the present disclosure will hereinafter be described using FIG. 5.

Figure 5:
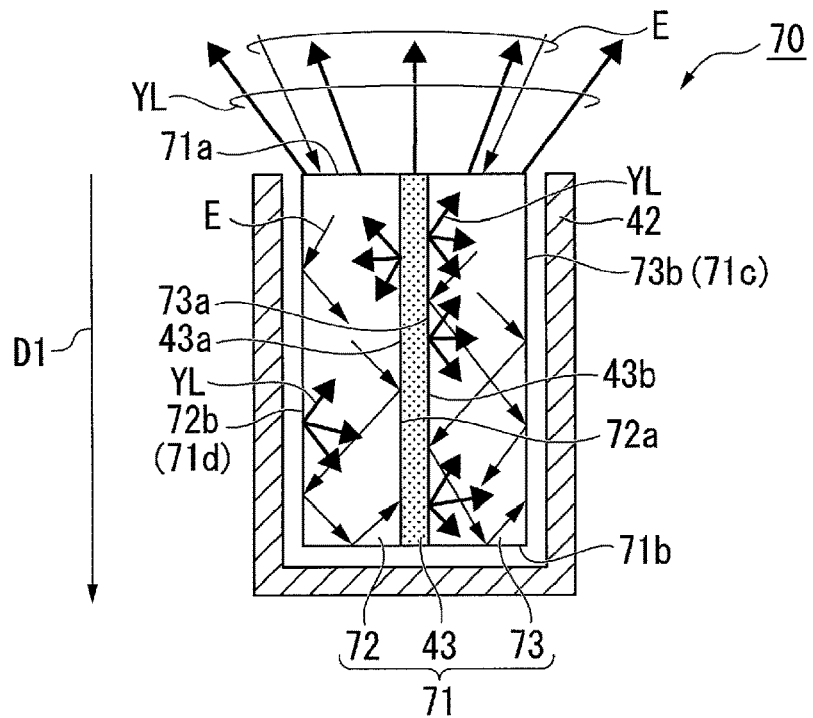
FIG. 5 is a cross-sectional view of a wavelength conversion element in a third embodiment.

FIG. 5 is a cross-sectional view of a wavelength conversion element according to the present embodiment.

As shown in FIG. 5, a wavelength conversion element 70 according to the present embodiment is provided with a cemented body 71 and the reflecting member 42. The cemented body 71 in the present embodiment is formed by bonding the phosphor layer 43, a first light guide member 72, and a second light guide member 73 to each other.

The first light guide member 72 and the second light guide member 73 each have substantially the same configuration as that of the light guide member 44 in the first embodiment. The first light guide member 72 includes a second joint surface (the second surface) 72a parallel to the first direction D1, and a surface 72b facing to an opposite side to the second joint surface 72a. The second light guide member 73 includes a second joint surface 73a parallel to the first direction D1, and a surface 73b facing to an opposite side to the second joint surface 73a.

In the present embodiment, the reflecting member 42 is disposed so as to be opposed to a third outer circumferential surface 71c, and a fourth outer circumferential surface 71d parallel to the first direction D1 out of a plurality of outer circumferential surfaces in the cemented body 71.

The cemented body 71 in the present embodiment is formed by bonding the first joint surface 43a in the phosphor layer 43 and the second joint surface 72a in the first light guide member 72 to each other, and bonding a surface (a fourth surface) 43b opposite to the first joint surface 43a in the phosphor layer 43 and the second joint surface 73a in the second light guide member 73 to each other.

In other words, the phosphor layer 43 in the present embodiment is sandwiched between the first light guide member 72 and the second light guide member 73. In the present embodiment, the surface 72b of the first light guide member 72 forms the fourth outer circumferential surface 71d of the cemented body 71, and the surface 73b of the second light guide member 73 forms the third outer circumferential surface 71c of the cemented body 71.

In the wavelength conversion element 70 according to the present embodiment, since there is provided the cemented body 71 formed by sandwiching the phosphor layer 43 between the first light guide member 72 and the second light guide member 73, it is possible to make the excitation light E efficiently enter the both surfaces (the first joint surface 43a and the surface 43b) of the phosphor layer 43 by making the excitation light E propagate through the first light guide member 72 and the second light guide member 73. Thus, it is possible to generate the fluorescence YL high in luminance in the phosphor layer 43.

Fourth Embodiment

A fourth embodiment of the present disclosure will hereinafter be described using FIG. 6.

Figure 6:
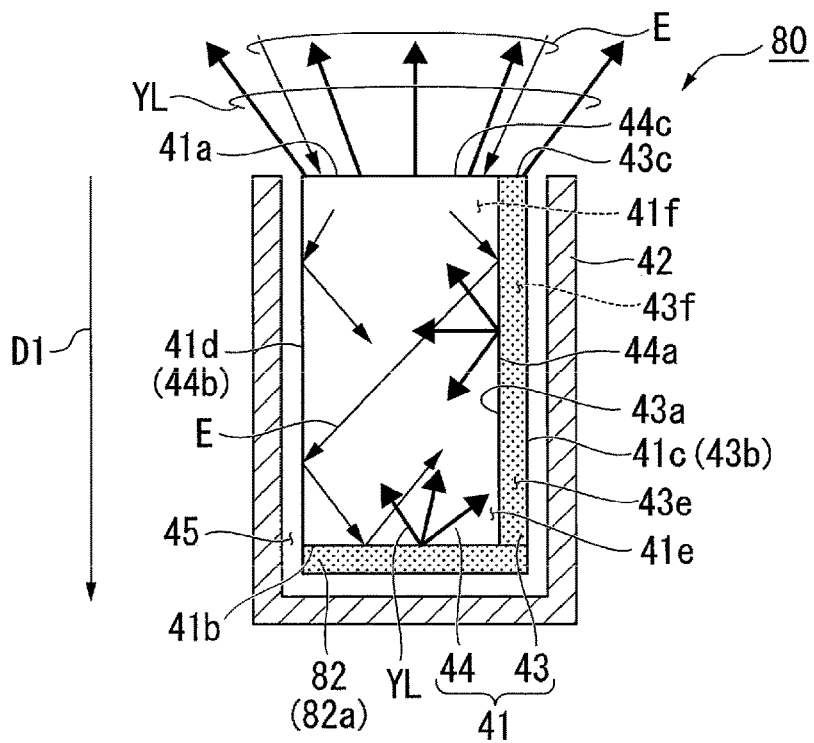
FIG. 6 is a cross-sectional view of a wavelength conversion element in a fourth embodiment.

FIG. 6 is a cross-sectional view of a wavelength conversion element according to the present embodiment.

As shown in FIG. 6, a wavelength conversion element 80 according to the present embodiment is provided with the cemented body 41, the reflecting member 42, and a diffusion element 82. The diffusion element 82 is disposed so as to be opposed to the second outer circumferential surface 41b opposite to the first outer circumferential surface 41a out of the outer circumferential surfaces of the cemented body 41. The diffusion element 82 is bonded to the second outer circumferential surface 41b. It should be noted that it is possible to dispose the diffusion element 82 so as to form a gap with the second outer circumferential surface 41b.

The diffusion element 82 is an element having a light diffusion property with respect to the light propagating through the light guide member 44. The diffusion element 82 in the present embodiment is a phosphor layer 82a. The phosphor layer 82a has substantially the same configuration as that of the phosphor layer 43. It should be noted that it is also possible to increase the light diffusion property by using a phosphor material high in content rate of voids, or by using a phosphor provided with a fine concavo-convex shape formed on the surface as the phosphor layer 82a.

In the wavelength conversion element 80 according to the present embodiment, since the phosphor layer 82a as the diffusion element 82 is disposed on the second outer circumferential surface 41b of the cemented body 41, it is possible for the phosphor layer 82a to convert the excitation light E which has propagated through the light guide member 44 and reached the second outer circumferential surface 41b of the cemented body 41 into the fluorescence YL. Thus, it is possible to generate the fluorescence YL higher in luminance. Further, the phosphor layer 82a functions also as a diffusion element for diffusely reflecting a part of the excitation light E. By the phosphor layer 82a diffusely reflecting the excitation light E toward a variety of directions, the excitation light E enters the phosphor layer 43, and is used for generating the fluorescence YL.

As described above, according to the wavelength conversion element 80 related to the present embodiment, it is possible to generate the fluorescence YL higher in luminance compared to the wavelength conversion element 40 according to the first embodiment.

It should be noted that the diffusion element 82 can be formed of a diffuser plate. According to this case, it is possible to make it easy to make the excitation light E having entered the third outer circumferential surface 41c of the cemented body 41 enter the phosphor layer 43 by diffusely reflecting the excitation light E toward a variety of directions.

Fifth Embodiment

A fifth embodiment of the present disclosure will hereinafter be described using FIG. 7.

Figure 7:
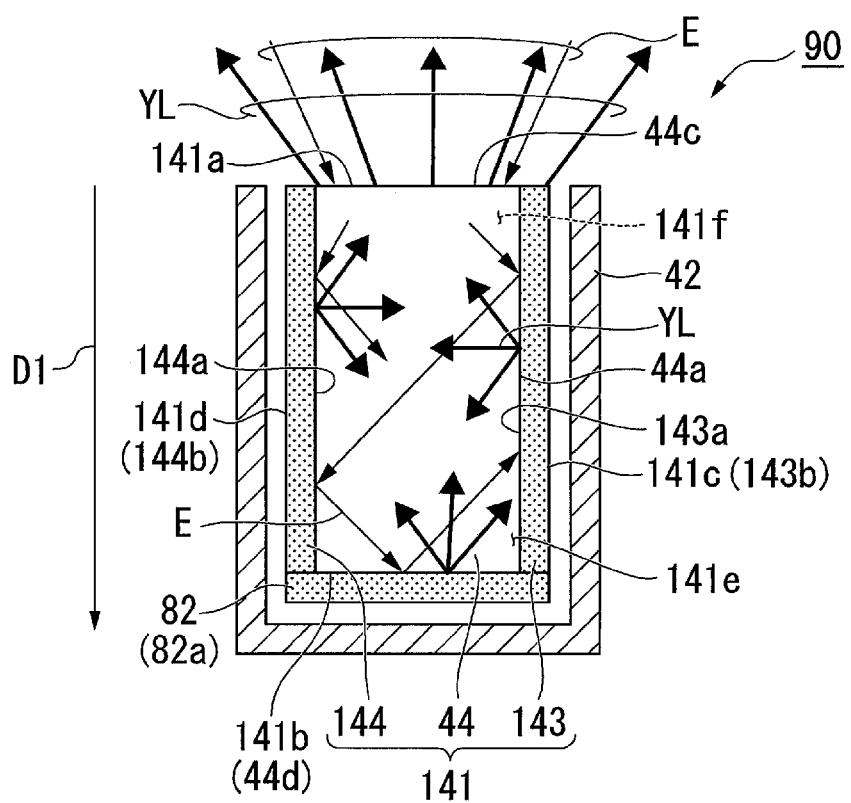
FIG. 7 is a cross-sectional view of a wavelength conversion element in a fifth embodiment.

FIG. 7 is a cross-sectional view of a wavelength conversion element according to the present embodiment.

As shown in FIG. 7, a wavelength conversion element 90 according to the present embodiment is provided with the cemented body 141, the reflecting member 42, and the diffusion element 82. The diffusion element 82 is disposed so as to be opposed to the second outer circumferential surface 141b opposite to the first outer circumferential surface 141a out of the outer circumferential surfaces of the cemented body 141. The diffusion element 82 is bonded to the second outer circumferential surface 141b. It should be noted that it is possible to dispose the diffusion element 82 so as to form a gap with the second outer circumferential surface 141b.

The diffusion element 82 diffusely reflects the light propagating through the light guide member 44. The diffusion element 82 in the present embodiment is the phosphor layer 82a.

In the wavelength conversion element 90 according to the present embodiment, since the phosphor layer 82a as the diffusion element is disposed on the second outer circumferential surface 141b of the cemented body 141, it is possible to generate the fluorescence YL higher in luminance since the excitation light E propagating through the light guide member 44 enters the phosphor layer 82a. Further, the phosphor layer 82a functions also as a diffusion element for diffusely reflecting a part of the excitation light E. By the phosphor layer 82a diffusely reflecting the excitation light E toward a variety of directions, the excitation light E enters the first phosphor layer 143 or the second phosphor layer 144, and is used for generating the fluorescence YL.

According to the wavelength conversion element 90 related to the present embodiment, it is possible to generate the fluorescence YL higher in luminance than the wavelength conversion element 140 according to the second embodiment.

It should be noted that the diffusion element 82 can be formed of a diffuser plate. In this case, it is possible for the diffusion element 82 to make it easy to make the excitation light E enter the first phosphor layer 143 or the second phosphor layer 144 by diffusely reflecting the excitation light toward a variety of directions.

It should be noted that although in the embodiments described above, there is described an aspect of the present disclosure, the content of the present disclosure is not limited to the above, but can arbitrarily be modified within the scope or the spirit of the present disclosure.

For example, although in the embodiment described above, the reflecting member 42 is disposed so as to be opposed to the second outer circumferential surface 41b, the third outer circumferential surface 41c, and the fourth outer circumferential surface 41d, it is also possible to dispose the reflecting member 42 so as to correspond to the fifth outer circumferential surface 41e and the sixth outer circumferential surface 41f parallel to the first direction D1. According to this configuration, by sending back the light emitted outside from the cemented body 41 to the inside of the cemented body 41, it is possible to increase the light use efficiency. It should be noted that in the second embodiment, it is also possible to dispose the reflecting member 42 so as to correspond to the fifth outer circumferential surface 141e and the sixth outer circumferential surface 141f parallel to the first direction D1.

Further, although in the embodiments described above, the reflective wavelength conversion element is cited as an example of the wavelength conversion elements 40, 70, 80, 90, and 140, it is possible to apply the present disclosure to a transmissive wavelength conversion element for emitting the fluorescence YL from a surface different from the plane of incidence of the excitation light E.

Further, in the second embodiment or the fifth embodiment described above, the first phosphor layer 143 and the second phosphor layer 144 are formed of respective phosphors different in characteristics from each other. For example, by adopting a phosphor for emitting green fluorescence (second light) due to the blue excitation light (first light) as the first phosphor layer 143, and adopting a phosphor for emitting yellow fluorescence or red fluorescence (third light) different in wavelength band from the excitation light and the green fluorescence due to the blue excitation light (the first light) as the second phosphor layer 144, it is possible to obtain a desired spectral characteristic.

Further, in the first embodiment described above, the third embodiment described above, or the fourth embodiment described above, it is possible to form the phosphor layer 43 by stacking two phosphors different in characteristics from each other on one another. For example, the phosphor layer 43 can be formed by stacking a first phosphor member (a first member) for emitting the green fluorescence (the second light) due to the blue excitation light (the first light), and a second phosphor member (a second member) for emitting the yellow fluorescence or the red fluorescence (the third light) different in wavelength band from the excitation light and the green fluorescence due to the blue excitation light (the first light) on one another.

What is claimed is:

1. A wavelength conversion element comprising:
   a cemented body obtained by bonding a first wavelength conversion member which is excited by first light to emit second light having a wavelength band different from a wavelength band of the first light, and a first light guide member configured to transmit the first light and the second light; and
   a reflecting member which is disposed so as to be opposed to at least one surface parallel to a first direction out of a plurality of outer circumferential surfaces of the cemented body, and reflects at least one of the first light and the second light, wherein
   the cemented body is formed by bonding a first surface parallel to the first direction in the first wavelength conversion member, and a second surface parallel to the first direction in the first light guide member to each other, and
   the first light enters the cemented body from a first outer circumferential surface crossing the first direction out of the plurality of outer circumferential surfaces.

2. The wavelength conversion element according to claim 1, wherein
   the cemented body has a second wavelength conversion member bonded to a third surface opposite to the second surface of the first light guide member, and
   the first light guide member is sandwiched by the first wavelength conversion member and the second wavelength conversion member.

3. The wavelength conversion element according to claim 2, wherein
   the second wavelength conversion member is excited by the first light to emit third light having a wavelength band different from the wavelength band of the first light and the wavelength band of the second light.

4. The wavelength conversion element according to claim 1, wherein
   the cemented body has a second light guide member bonded to a fourth surface opposite to the first surface of the first wavelength conversion member, and is configured to transmit the first light and the second light, and
   the first wavelength conversion member is sandwiched by the first light guide member and the second light guide member.

5. The wavelength conversion element according to claim 1, wherein
   the first wavelength conversion member includes
      a first member which is excited by the first light to emit the second light, and
      a second member which is excited by the first light to emit third light having a wavelength band different from the wavelength band of the first light and the wavelength band of the second light.

6. The wavelength conversion element according to claim 1, further comprising:
   a diffusion element which is disposed so as to be opposed to a second outer circumferential surface opposite to the first outer circumferential surface out of the outer circumferential surfaces of the cemented body, and diffuses at least one of the first light and the second light.

7. The wavelength conversion element according to claim 1, wherein
   the first light guide member is made of sapphire.

8. A light source device comprising:
   a light source configured to emit the first light; and
   the wavelength conversion element according to claim 1.

9. A projector comprising:
   the light source device according to claim 8;
   a light modulation device configured to modulate light from the light source device in accordance with image information; and
   a projection optical device configured to project the light modulated by the light modulation device.

* * * * *